(12) United States Patent
Liu

(10) Patent No.: US 9,341,398 B2
(45) Date of Patent: May 17, 2016

(54) AIR CONDITIONING SYSTEM PROVIDED WITH AN ELECTRONIC EXPANSION VALVE

(75) Inventor: Jin Ming Liu, Conflans Sainte Honorine (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 348 days.

(21) Appl. No.: 12/038,848

(22) Filed: Feb. 28, 2008

(65) Prior Publication Data

US 2008/0229770 A1  Sep. 25, 2008

(30) Foreign Application Priority Data

Feb. 28, 2007 (FR) ..................... 07 01445

(51) Int. Cl.
| | |
|---|---|
| F25B 41/04 | (2006.01) |
| F25B 41/06 | (2006.01) |
| F25B 49/02 | (2006.01) |

(52) U.S. Cl.
CPC ............ *F25B 41/062* (2013.01); *F25B 49/022* (2013.01); *F25B 2341/063* (2013.01); *F25B 2341/065* (2013.01); *F25B 2600/17* (2013.01); *F25B 2700/21172* (2013.01); *F25B 2700/21173* (2013.01); *Y02B 30/72* (2013.01)

(58) Field of Classification Search
CPC ............... F25B 41/062; F25B 49/022; F25B 2341/063; F25B 2341/065; F25B 2600/17; F25B 2700/21172; F25B 2700/21173; Y02B 30/72
USPC .............. 62/222, 225, 226, 228.1, 228.3, 513
See application file for complete search history.

(56) References Cited

U.S. PATENT DOCUMENTS

| | | | | |
|---|---|---|---|---|
| 5,771,703 | A * | 6/1998 | Rajendran ....................... | 62/204 |
| 6,044,655 | A * | 4/2000 | Ozaki et al. ..................... | 62/205 |
| 6,141,981 | A * | 11/2000 | Reason et al. .................. | 62/225 |
| 6,148,628 | A * | 11/2000 | Reason et al. .................. | 62/223 |
| 6,260,368 | B1 * | 7/2001 | Redlich .......................... | 62/212 |
| 6,318,100 | B1 * | 11/2001 | Brendel et al. ................. | 62/217 |

(Continued)

FOREIGN PATENT DOCUMENTS

| | | |
|---|---|---|
| DE | 2451361 A1 | 5/1976 |
| EP | 0837291 A2 | 4/1998 |

(Continued)

OTHER PUBLICATIONS

NPL "Troubleshooting HVACR Systems Using Superheat and Subcooling" by Fluke; pp. 1-8, Aug. 7, 2006.*

(Continued)

*Primary Examiner* — Marc Norman
*Assistant Examiner* — Paolo Gonzalez
(74) *Attorney, Agent, or Firm* — Howard & Howard Attorneys PLLC

(57) ABSTRACT

An air conditioning device is used in a motor vehicle. The air conditioning device includes air conditioning circuit, which includes a compressor (14), a condenser (11), and/or an internal exchanger, an electric expansion valve (12) which opening ratio is changed according to a control signal, and an evaporator (13), which are traversed in this order by a refrigerant fluid and a control unit (40) capable of controlling a control signal of the expansion valve so as to regulate a control variable relating to the superheating of the evaporator or to the sub-cooling of the condenser (11) according to a chosen regulation rule.

9 Claims, 6 Drawing Sheets

(56) References Cited

U.S. PATENT DOCUMENTS

| | | | |
|---|---|---|---|
| 6,321,549 B1 * | 11/2001 | Reason et al. | 62/223 |
| 6,405,554 B1 * | 6/2002 | Kawakatu et al. | 62/335 |
| 6,523,360 B2 * | 2/2003 | Watanabe et al. | 62/204 |
| 6,581,397 B1 * | 6/2003 | Taira et al. | 62/199 |
| 6,769,264 B2 * | 8/2004 | Moon et al. | 62/204 |
| 6,796,137 B2 * | 9/2004 | Liu et al. | 62/228.3 |
| 2001/0000050 A1 * | 3/2001 | Okazaki et al. | 62/149 |
| 2002/0053603 A1 * | 5/2002 | Bernini | 237/8 A |
| 2003/0159452 A1 * | 8/2003 | Ben Yahia | 62/222 |
| 2004/0060310 A1 * | 4/2004 | Liu et al. | 62/228.3 |
| 2004/0068999 A1 * | 4/2004 | Jessen | 62/222 |
| 2004/0144106 A1 | 7/2004 | Douglas et al. | |
| 2005/0081539 A1 * | 4/2005 | Hwang et al. | 62/160 |
| 2006/0112702 A1 * | 6/2006 | Martin et al. | 62/180 |
| 2006/0213208 A1 * | 9/2006 | Iwaki et al. | 62/222 |
| 2007/0000262 A1 * | 1/2007 | Ikegami et al. | 62/170 |
| 2007/0121701 A1 * | 5/2007 | Gennissen et al. | 374/143 |
| 2007/0125106 A1 * | 6/2007 | Ishikawa et al. | 62/183 |

FOREIGN PATENT DOCUMENTS

| | | | | |
|---|---|---|---|---|
| EP | 1493979 A1 | 1/2005 | | |
| FR | 2539855 A1 | 7/1984 | | |
| JP | 2000213819 A * | 8/2000 | | F25B 1/00 |
| JP | 2002-081766 A | 3/2002 | | |
| WO | WO 2004005059 A1 * | 1/2004 | | |
| WO | WO 2005051691 A1 * | 6/2005 | | |
| WO | WO 2006-073814 A2 | 7/2006 | | |
| WO | WO 2006087005 A1 * | 8/2006 | | F25B 9/00 |

OTHER PUBLICATIONS

"Refrigeration Basics 101" by Nelson, pp. 1-8.*
"Refrigerant Subcooling—Technology for improving cooling system performance" by Pacific Northwest National Laboratory, 24 pages, Mar. 1999.*
"Quick Facts: Superheat and Subcooling" by Flow Controls Division of Emerson Climate Technologies, 3 pages, Jun. 13, 2005.*
JP2002081766A_English Translation.*
JP2000213819A_Machine Translation.*
English language abstract for EP1493979 extracted from espacenet.com database, dated Nov. 3, 2008.
English language abstract for FR2539855 extracted from espacenet.com database, dated Nov. 3, 2008.
English language translation and abstract for JP2002-081766 extracted from PAJ database, dated Nov. 3, 2008, 45 pages.
Search Report for FR0701445, dated Nov. 15, 2007, 2 pages.
English language translation for DE 2451361, 41 pages.
Heyl, P.; The Effective Use of the Internal Heat Exchanger in Transcritical CO2 Processes; vol. 39; Aug. 2003; 11 pages.

* cited by examiner

AIR CONDITIONING SYSTEM PROVIDED WITH AN ELECTRONIC EXPANSION VALVE

RELATED APPLICATIONS

This application claims priority to and all the advantages of French Patent Application No. FR 07/01445, filed on Feb. 28, 2007.

BACKGROUND OF THE INVENTION

1. Field of the Invention

The invention concerns air conditioning systems, in particular for automobile vehicles.

2. Description of the Related Art

An air conditioning system of this type is provided with an air conditioning circuit primarily comprising a compressor, a condenser or a gas cooler, an expansion device and an evaporator, which are passed through, in this order, by a refrigerant fluid.

The compressor compresses the refrigerant fluid in order to bring it to an elevated pressure, then passes it on to the condenser, where it is cooled. In the expansion device, the refrigerant fluid is expanded so as to lower its pressure. The low pressure fluid then passes through the evaporator so that it is vaporized before going back into the compressor. A flow of air traversing the evaporator is cooled or air conditioned and is sent to the passenger compartment of an automobile vehicle.

Using an electronic expansion valve as an expansion device is particularly well known, in order to control the rate of fluid expanded.

In such an expansion valve, the degree of opening is regulated by a control signal adjusted as a function of certain working parameters.

For example, regulating the passage section of an electronic expansion valve as a function of a measurement of pressure and temperature, provided by a sensor placed at the outlet of the evaporator, is well known. However, pressure based sensors of the type used upon exit from the evaporator are expensive.

More generally, well-known systems do not permit optimizing the degree of opening of the electronic expansion valve as a function of the working conditions of the air conditioning and they utilize a significant number of sensors, thereby considerably increasing the overall cost of the system. Moreover, such systems require the establishment of sensors at different points, which consequently makes these systems more complex and cumbersome.

SUMMARY OF THE INVENTION AND ADVANTAGES

The invention aims to improve the situation by introducing an air conditioning system, notably for a motor vehicle, provided with an air conditioning circuit. The air conditioning circuit comprises a compressor, a condenser or a gas cooler, an electronic expansion valve for which the degree of opening varies as a function of a command signal, and an evaporator, which are passed through in this order by a refrigerant fluid. According to one embodiment variation, the system can potentially include an internal exchanger. The system further includes a control unit capable of controlling the control signal for the expansion valve so as to regulate the control variable relating to the superheating of the evaporator or to the sub-cooling of the condenser, according to a chosen regulation rule.

The control signal for the valve of the compressor allows:
obtaining an optimal electronic structure while having a minimum of sensors,
having a maximum optimal coefficient of performance (COP), and
protecting the system by limiting the temperature of expulsion and/or induction of the compressor The invention thereby allows optimizing the coefficient of performance (COP) for the air conditioning while using a minimum number of sensors, and therefore reduces the cost of the system.

Optional characteristics of the air conditioning system of the invention, which are complementary or for substitution, are expressed below:
The control unit is capable of carrying out the regulation of the control variable by comparing the control variable to a reference value for the control variable.
The variable relating to the superheating corresponds to the difference between two temperature measurements taken at the level of the evaporator.
The two temperature measurements correspond respectively to the temperature of the fluid upon entry and upon exit from the evaporator.
It includes two temperature probes placed into contact with the fluid upon entry into and upon exit from the evaporator for providing the two temperature measurements.
The two temperature measurements correspond respectively to the maximum temperature and the minimum temperature of the air flow that passes through the evaporator.
It includes two temperature probes, placed within the fins of the evaporator and/or behind the evaporator, to respectively provide a measurement of the maximum temperature and the minimum temperature.
The compressor is an externally controlled compressor, provided with a control valve, for which the passage section varies as a function of a control signal, while the control unit is capable of controlling the control signal of the compressor so as to regulate the evaporation temperature of the evaporator, calculated as a function of the temperature measurements.
The variable relating to the sub-cooling corresponds to the sub-cooling temperature of the refrigerant fluid.
It includes a temperature probe placed into contact with the fluid upon exit from the condenser for providing a measurement of the sub-cooling temperature.
It includes a temperature probe placed into contact with the fluid upon entry into the expansion valve for providing the a measurement of the sub-cooling temperature.
The compressor is externally controlled, while the control unit is furthermore capable of controlling the expansion valve and the compressor so as to maintain the temperature and the expulsion pressure upon exit from the compressor below respective predetermined thresholds.
The variable relating to the sub-cooling corresponds to the difference between the saturation temperature of the refrigerant fluid and the sub-cooling temperature of the refrigerant fluid.
It includes a temperature probe placed into contact with the fluid upon entry into the expansion valve for providing a measurement of the sub-cooling temperature.
It includes a pressure sensor placed into contact with the fluid upon entry into the expansion valve for providing a measurement of the pressure upon entry into the expansion valve while the control unit is capable of estimating the saturation temperature of the fluid from the pressure measurement.

The variable relating to the sub-cooling corresponds to the pressure and the temperature upon exit from the condenser.

It includes a pressure sensor upon exit from the condenser to measure the pressure of the fluid upon exiting the condenser.

It includes a temperature sensor capable of providing a measurement of the temperature of the fluid upon exiting the condenser, while the control unit is capable of estimating the reference value of the pressure upon exiting the condenser from the measurement of the temperature provided by the sensor.

The temperature sensor is placed into contact with the fluid upon exiting the condenser.

The air conditioning circuit further comprises an internal exchanger, while the control unit is further capable of controlling the expansion valve so as to further regulate the efficiency of the internal exchanger.

The control unit is capable of comparing the efficiency of the internal exchanger to a predefined threshold in order to regulate the efficiency of the internal exchanger.

The control unit is capable of determining the efficiency value of the internal exchanger from the mass output of the fluid in the condenser, estimated as a function of measurements of the high pressure and the sub-cooling temperature of the refrigerant fluid.

It includes a temperature and pressure sensor placed at the outlet of the condenser in order to measure the high pressure and the sub-cooling temperature of the refrigerant liquid.

The regulation of the control variable is a closed-loop regulation.

The measurements for temperature and pressure are carried out by a pressure and temperature sensor positioned at the outlet of the compressor and/or at the inlet and/or the outlet of the condenser and/or at the inlet of the expansion valve.

The control unit generates the control signal for the expansion valve and/or the compressor for limiting the temperature of discharge and/or induction of the compressor.

Moreover, the invention proposes a process for regulation of an air conditioning circuit, comprising a compressor, a condenser, an electronic expansion valve, for which the degree of opening varies as a function of a control signal, and an evaporator, which are run through in this order by a refrigerant fluid, characterized in that the control signal of the expansion valve is controlled so as to regulate a control variable relating to the superheating of the evaporator and/or to the sub-cooling of the condenser according to a chosen regulation rule.

BRIEF DESCRIPTION OF THE DRAWINGS

Other characteristics and advantages of the invention shall appear with the examination of the detailed description below, and the attached drawings, in which.

The drawings contain, essentially, elements of a certain character. They can therefore not only serve to better put across the description, but also to contribute to the definition of the invention, if appropriate.

DETAILED DESCRIPTION OF THE EXEMPLARY EMBODIMENT

Figure 1:
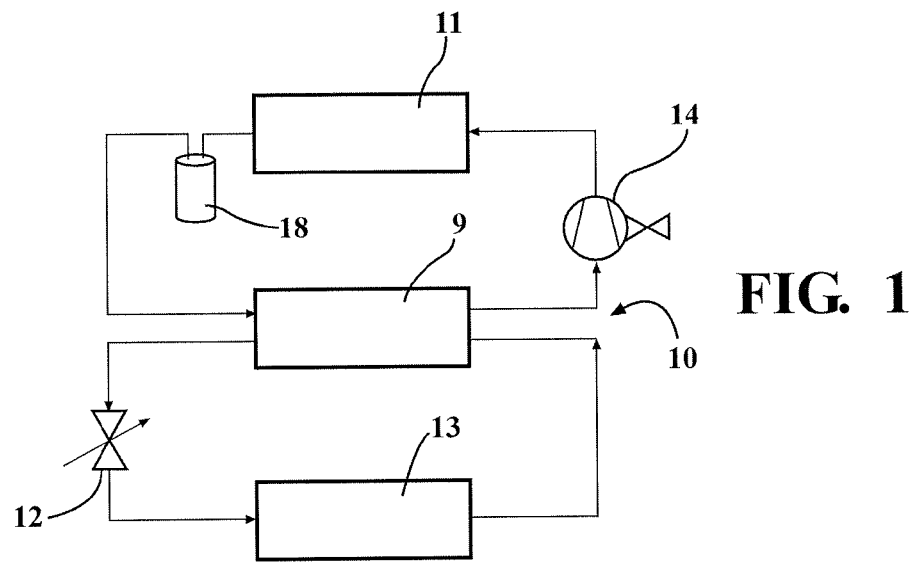
FIG. 1 is a diagram of an air conditioning circuit utilized in the system of the invention.

We refer first of all to FIG. 1, which represents a diagram of an air conditioning circuit 10, intended in particular to be integrated into an automobile vehicle.

The air conditioning circuit is passed through by a refrigerant fluid, in particular a fluorochloride fluid functioning according to a sub-critical cycle, such as the fluid R-134a. However, the present invention further covers air conditioning circuits passed through by any alternative fluids employed in thermodynamic loops for such systems and functioning according to a super critical cycle.

The air conditioning circuit 10 principally comprises a compressor 14, a condenser 11, an expansion device 12, and an evaporator 13, which are passed through in this order by the refrigerant fluid.

Compressor 14 receives the fluid in its gaseous state and compresses it. The highly pressurized refrigerant fluid then passes into the condenser 11, where it is cooled. Expansion device 12 then lowers the pressure of the fluid, before passing into evaporator 13. In evaporator 13, the fluid is brought to its gaseous state so as to cool or to air condition a flow of air traversing the evaporator, which can be sent into the passenger compartment of the vehicle.

More precisely, condenser 11 is traversed by a flow of air allowing evacuation of the heat withdrawn by the refrigerant fluid. The flow of air traversing the condenser is, in certain working conditions, propelled by a ventilator drive section. In condenser 11, the refrigerant fluid first undergoes a de-superheating at a constant pressure to lower the temperature of the fluid, then a condensation at a constant pressure. The fluid is then sub-cooled in order to be supplied to the expander as a liquid.

In a first part of evaporator 13, the fluid in a mixed liquid/vapor state absorbs heat until all the liquid is vaporized. In a second part of the evaporator, called the "superheating zone", the entirely vaporized fluid is superheated.

The circuit can further include an internal thermal exchanger 9, allowing the fluid circulating from condenser 11 as a gas to expansion device 12 to give up heat to the fluid circulating from evaporator 13 towards compressor 14.

A bottle 18 can also be provided at the outlet of condenser 11 in order to store the excess of liquid that exits therefrom. According to an alternative embodiment, bottle 18 can be installed at the inlet of expansion device 12.

Compressor 14 is in particular an externally controlled compressor with variable capacity displacement. Although the invention can be applied to other types of compressors, for example clutched internally controlled compressors, the invention is particularly advantageous for externally controlled compressors with variable capacity displacement. The following description shall therefore be made in reference to, but not limited to, an externally controlled compressor 14 with a variable capacity displacement.

According to the present invention, expansion device 12 is an electronic expansion valve. Electronic expansion valves have a passage section for which the degree of opening varies as a function of a command signal.

Figure 2:
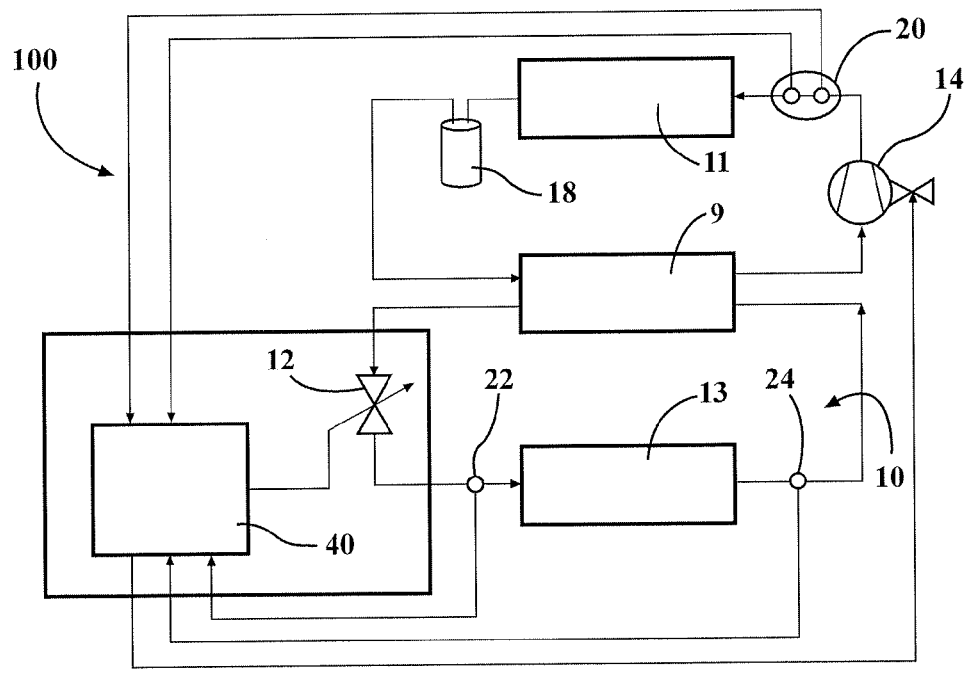
FIG. 2 is a diagram of an air conditioning system according to a first embodiment of the invention.

FIG. 2 is a diagram representing a first embodiment of an air conditioning system 100 according to the invention, intended to equip an automobile vehicle. The system is provided with an air conditioning circuit 10, described in reference to FIG. 1.

In a conventional manner, the system comprises an air conditioning command device, not shown, to regulate the working parameters of the air conditioning. These parameters are notably a function of the comfort conditions required by the user and defined by the signals given by the control panel placed in the passenger compartment of the vehicle. Likewise, these parameters are dependent upon exterior conditions and quantities measured on the air conditioning circuit.

The air conditioning control device includes an air conditioning calculator to calculate certain working parameters, a unit for regulation of the comfort of the air conditioned passenger compartment, and a passenger compartment control panel, the purpose of which in particular is to fix the evaporation temperature ($T_{evapocons}$) reference value.

According to the invention, the system includes a control unit 40 suitable to control the control signal for the expansion valve 12 so as to regulate the control variable relating to the superheating of the evaporator or to the sub-cooling of the condenser 11, according to a chosen regulation rule.

The control unit 40 proposed by the invention thereby allows controlling expansion valve 12 so as to optimize the superheating at the outlet of the evaporator or the sub-cooling at the inlet of expansion valve 12.

The invention allows not only optimizing the superheating at the outlet of the evaporator and the sub-cooling at the inlet of expansion valve 12, but also limiting the temperature of the fluid at the inlet or at the outlet of the compressor. The invention also allows limiting the reference value of the superheating and/or of the sub-cooling by taking into account the maximum imbalance between the temperatures of the evaporator. This imbalance is well known for having a large influence on the comfort of the user. By indirectly controlling this imbalance, the invention consequently improves comfort in the passenger compartment while optimizing the coefficient of performance (COP) of the air conditioning circuit.

Figure 3:
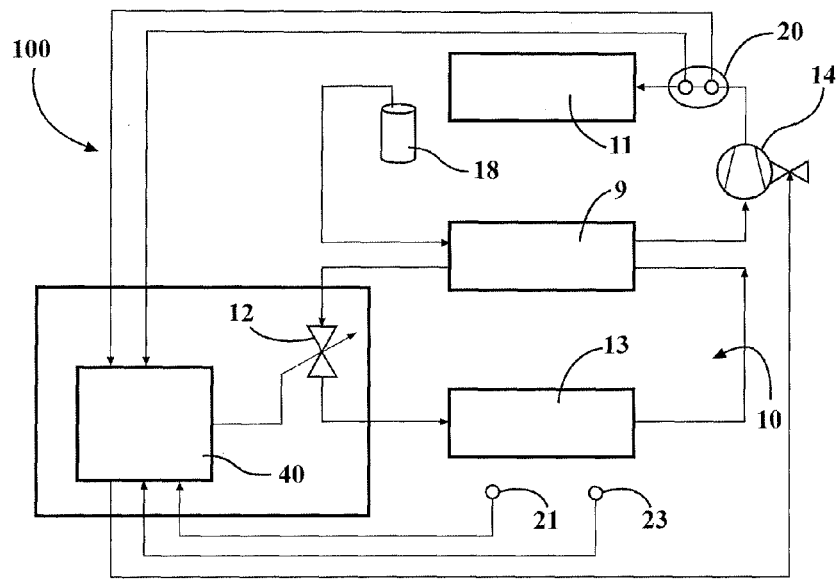
FIG. 3 is a diagram representing a variant of the system from FIG. 2.

FIGS. 2 and 3 correspond to a first embodiment in which the functioning of expansion valve 12 is controlled by control unit 40 so as to regulate a variable relating to the superheating of the evaporator, according to a chosen regulation rule.

In this first embodiment of the invention, the variable relating to the superheating of the evaporator corresponds in particular to the difference between two measurements of representative temperature measurements of the superheating of evaporator 13.

More precisely, in FIG. 2, the variable relating to the superheating corresponds to the difference ($T_{out}-T_{in}$) between the temperature $T_{out}$ of the refrigerant fluid upon exit from the evaporator and the temperature $T_{in}$ of the refrigerant fluid upon entry into the evaporator. The temperatures $T_{out}$ and $T_{in}$ are, according to the embodiment example from FIG. 2, measured by utilizing temperature probes 24 and 22, respectively placed at the outlet of the evaporator and the inlet of the evaporator, in contact with the refrigerant fluid.

In the variant from FIG. 3, the variable relating to the superheating of the evaporator corresponds to the difference ($T_{max}-T_{min}$) between the maximum temperature $T_{max}$ of evaporator 13 and the minimum temperature $T_{min}$ of evaporator 13 of the air that traverses evaporator 13, at the level of the superheating zone.

The temperatures $T_{max}$ and $T_{min}$ are, according to the embodiment example from FIG. 3, to be measured by utilizing conventionally structured thermistor probes 23 and 21, placed in the fins of evaporator 13 or behind evaporator 13, respectively in the 'hottest' zone and the 'coldest' zone of evaporator 13, in its superheating zone. The placement of temperature probes is determined by the mapping of evaporator 13, that is to say, the temperature distribution of evaporator 13.

The 'hottest' zone means the region of evaporator 13 having the highest temperature and the 'coldest' zone means the region of evaporator 13 having the lowest temperature.

The variant from FIG. 3 allows measuring the imbalance of the temperature of the air flow traversing the evaporator, without having to insert two temperature sensors in the conduits of the air conditioning circuit, and therefore allows limiting fluid leaks.

In the first embodiment of the invention, control unit 40 regulates the functioning of expansion valve 12 by controlling the variable relating to the superheating, that is to say, ($T_{out}-T_{in}$) in the case of FIG. 2 or ($T_{max}$ $T_{min}$) in the case of FIG. 3, according to an adapted regulation rule.

In particular, the regulation rule can be a closed loop regulation, of a Proportional Integral Derivative (PID) for example. In this case, the control unit determines the reference value of the variable relating to the superheating, namely ($T_{out}-T_{in})_{cons}$ or ($T_{max}-T_{rain})_{cons}$ depending on the case, then compares the variable relating to superheating, as determined from the measurements provided by sensors 24 and 22, or 23 and 21, whichever the case may be, with the reference value for this variable. The control signal for expansion valve 12 is then adjusted such that the variable relating to superheating does not reach its reference value.

Additionally, the invention proposes regulating compressor 14, when this is an externally controlled compressor. An externally controlled compressor is provided with a control valve that adjusts the cylinder of the compressor as a function of a control signal.

Externally controlled compressors are conventionally controlled by using a closed loop regulation rule, for example a PID regulation, that relies on the minimization of difference between the measurement of the evaporation temperature $T_{evapo}$ of the compressor and the reference value $T_{evapocons}$ of the evaporation temperature of the compressor ($T_{evapo}$-$T_{evapocons}$). The reference value of the evaporation temperature represents the target temperature required in the passenger compartment by a passenger of the vehicle.

The invention provides for implementing such a regulation rule for externally controlled compressor 14 by using the temperature measurements that bring into play the control variable relating to superheating, that is to say $T_{in}$ and $T_{out}$ in the case of FIG. 2 or $T_{min}$ and $T_{max}$ in the case of FIG. 3, to calculate the value of the evaporation temperature, to be regulated according to the chosen regulation rule of the compressor.

Thus, in the variant illustrated in FIG. 2, the value of the evaporation temperature $T_{evapo}$ is calculated as a function of the temperature of the refrigerant fluid upon exit from evaporator $T_{out}$ and the temperature of the refrigerant fluid upon entry into the evaporator $T_{in}$ according to the rule:

$$T_{evapo} = x \cdot T_{in} + (1-x) \cdot T_{out}.$$

where x is a coefficient experimentally obtained or calculated to estimate the temperature of the air traversing the evaporator.

In the variant represented in FIG. 3, the evaporation temperature $T_{evapo}$ is calculated by using the value of the maximum temperature of the air $T_{max}$ and the value of the minimum temperature of the air $T_{min}$ measured in the superheating zone of the evaporator, according to the rule:

$$T_{evapo} = x \cdot T_{min} + (1-x) \cdot T_{max}.$$

where x is a coefficient experimentally obtained or calculated to estimate the temperature of the air traversing the evaporator.

Thus, the value of the evaporation temperature obtained in accordance with the variant from FIG. 3 represents the average temperature of the air behind the evaporator.

Control unit 40 can then implement a conventional regulation, for example of a PID type, of the compressor so as to minimize the difference between the value thus calculated of the evaporation temperature $T_{evapo}$ and the reference value of the evaporation temperature $T_{evapocons}$ provided by the control panel of the passenger compartment.

Figure 4:
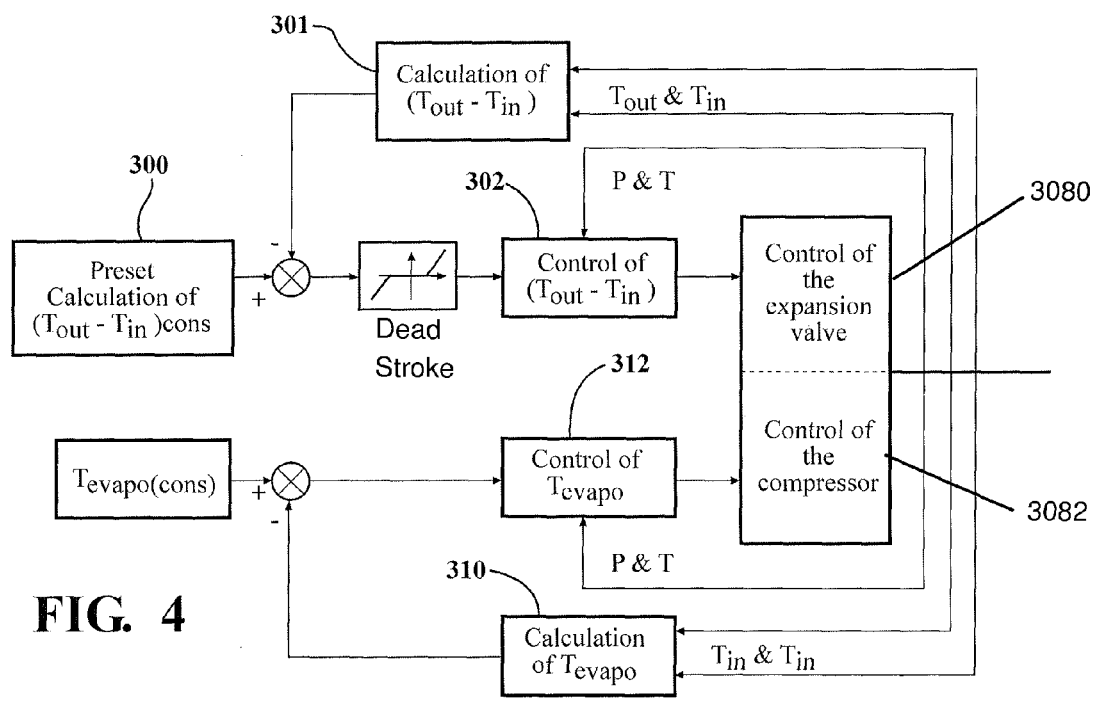
FIG. 4 is a functional diagram of the first embodiment of the invention illustrated in FIG. 2.

Reference is now made to the functional diagram of FIG. 4, that illustrates the control of expansion valve 12 and the externally controlled compressor according to the variant from FIG. 2. This functional diagram applies analogously to the embodiment from FIG. 3, by replacing the parameter $T_{in}$ by $T_{min}$ and the parameter $T_{out}$ by $T_{max}$.

At step 300, control unit 40 determines the reference value for the variable relating to superheating $(T_{out}-T_{in})_{cons}$. This reference value will be determined according to the curve giving the relation between the superheating and the optimal coefficient of performance (COP). This reference value varies as a function of the refrigerant fluid used. For the fluid R134a, this is on the order of 12° C. to 15° C.

At step 301, control unit 40 then determines the variable relating to superheating $(T_{out}-T_{in})$ from the measurements of the temperatures $T_{out}$ and $T_{in}$.

At step 302, control unit 40 then compares the variable relating to superheating determined at step 301 with its reference value obtained at step 300. The control signal for expansion valve 12 is then adjusted such that the variable relating to superheating does not reach its reference value, at step 302 (PID regulation).

At the same time, control unit 40 controls compressor 14 so as to regulate the evaporation temperature $T_{evapo}$.

Thus, at step 310, control unit 40 determines the evaporation temperature from the measurements of the temperatures $T_{out}$ and $T_{in}$.

At step 312, the control unit then compares the value of the evaporation temperature $T_{evapo}$ obtained at step 310 with its reference value $T_{evapocons}$, provided by the passenger compartment control panel. The control signal for compressor 14 is then adjusted such that the variable relating to superheating does not reach its reference value, at step 312 (PID regulation).

In the first embodiment, control unit 40 can additionally use the values of parameters for expulsion of the refrigerant fluid upon exiting from compressor 14 in order to control expansion valve 12 and, if appropriate, compressor 14. For that the system provides for a temperature and pressure sensor 20 placed at the outlet of compressor 14 or at the inlet of condenser 11 in order to measure the expulsion pressure Pr and the expulsion temperature Tr of the refrigerant fluid upon entry into the condenser. The values of these parameters Pr and Tr provided by sensor 20 are then compared to threshold values, and as a function of the result of this comparison, the functioning of expansion valve 12 and, if appropriate, that of compressor 14 are adjusted. Thus, as an example, the control unit increases the opening of expansion valve 12, if it is determined that the values measured by sensor are greater than their respective thresholds, and diminishes the capacity of compressor 14 if the degree of opening of expansion valve 12 is greater than a predetermined opening threshold, which allows maintaining the expulsion parameters Pr and Tr at an acceptable level.

According to another variant, it is possible to first reduce the capacity displacement of compressor 14. When the capacity displacement is reduced to a determined threshold, the degree of opening of expansion valve 12 begins to be increased.

Therefore, in this way, the first embodiment of the invention only uses three sensors to control expansion valve 12 and, if appropriate, compressor 14.

Moreover, the system, according to this first embodiment, does not use a precision sensor at the outlet of evaporator 13 to control expansion valve 12 and compressor 14, which allows reducing the costs of the system.

The first embodiment has been described in reference to an air conditioning circuit 10 equipped with an internal exchanger. However, the above description also applies to an air conditioning circuit devoid of an internal exchanger.

Reference is now made to FIGS. 5 through 9, which illustrate a second embodiment of the invention.

In this second embodiment, control unit 40 controls the control signal for expansion valve 12 so as to regulate a control variable relating to the sub-cooling at the inlet of expansion valve 12, according to a chosen regulation rule. The regulation of the sub-cooling upon entry into expansion valve 12 allows indirectly affecting the superheating at the outlet of evaporator 13.

Figure 5:
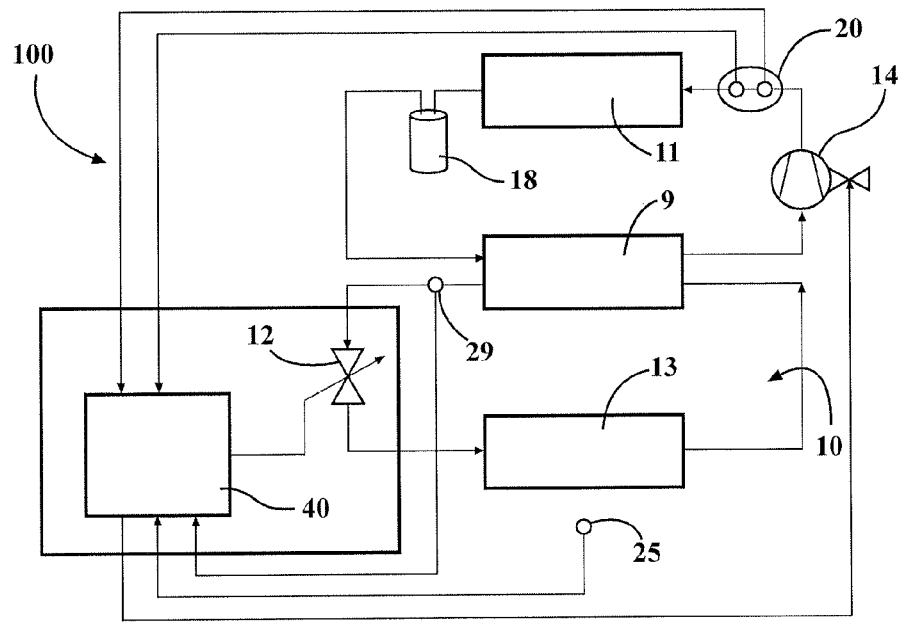
FIG. 5 is a diagram of an air conditioning system according to a second embodiment of the invention.
Figure 6:
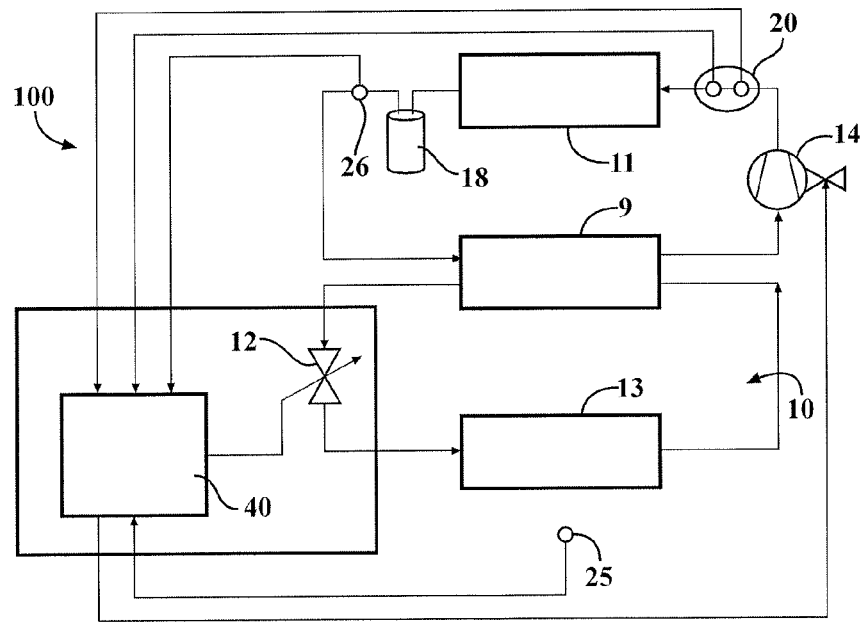
FIGS. 6 through 9 are diagrams representing embodiment variants of the system from FIG. 5.

In the variants represented in FIGS. 5 and 6, the control unit regulates the temperature Tsc of the refrigerant fluid, as a variable relating to the sub-cooling.

In particular, in the variant of FIG. 5, the sub-cooling temperature Tsc of the refrigerant fluid corresponds to the temperature of the refrigerant fluid at the inlet of expansion valve 12.

This temperature can be measured by using a temperature probe 29, placed at the inlet of expansion valve 12.

Control unit 40 controls expansion valve 12 so as to regulate temperature Tsc according to a chosen regulation rule, for example a PID type closed loop regulation rule. In order to do that, control unit 40 determines the reference value for the temperature of the fluid at the inlet of expansion valve 12, $Tsc_{cons}$, then controls the opening of expansion valve 12 so as to reduce the difference between the measurement of temperature Tsc provided by sensor 29 and the reference value of the temperature $Tsc_{cons}$. $Tsc_{cons}$ is determined according to a relationship between the sub-cooling and the optimal coefficient of performance (COP). The control of $Tsc_{cons}$ is simple.

Furthermore, a temperature and pressure sensor 20 can additionally be used at the outlet of compressor 14, in an analogous manner to the first embodiment.

In the variant of FIG. 6, the sub-cooling temperature Tsc of the refrigerant fluid corresponds to the temperature of the refrigerant fluid upon exiting condenser 11. This temperature can be measured by using a temperature probe 26, placed at the outlet of condenser 11.

Control unit 40 controls expansion valve 12 so as to regulate the pressure measured by sensor 20 so that the pressure is in correlation with the given rule, for example a PID type closed loop regulation rule, for the temperature measured by sensor 26.

Figure 7:
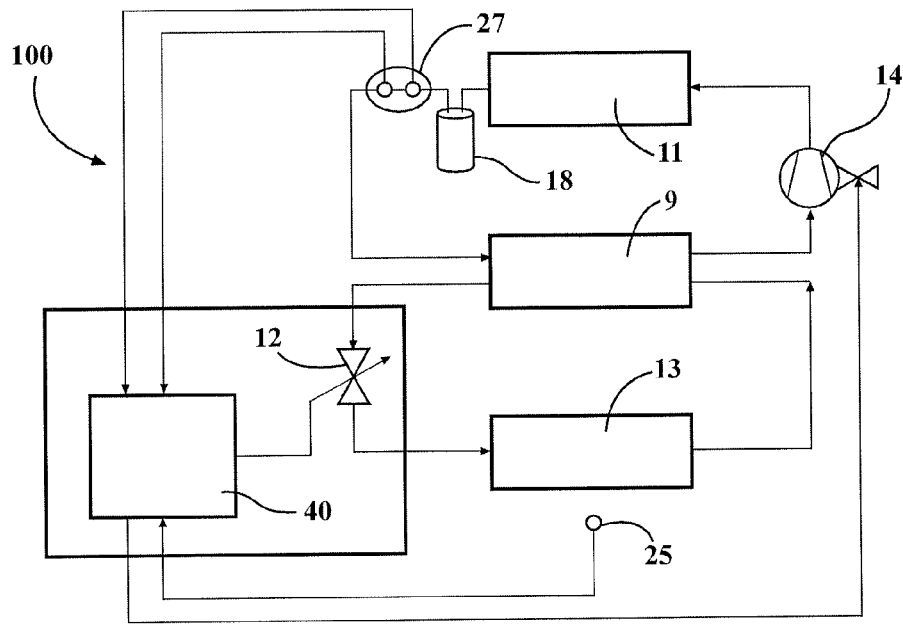
Figure 8:
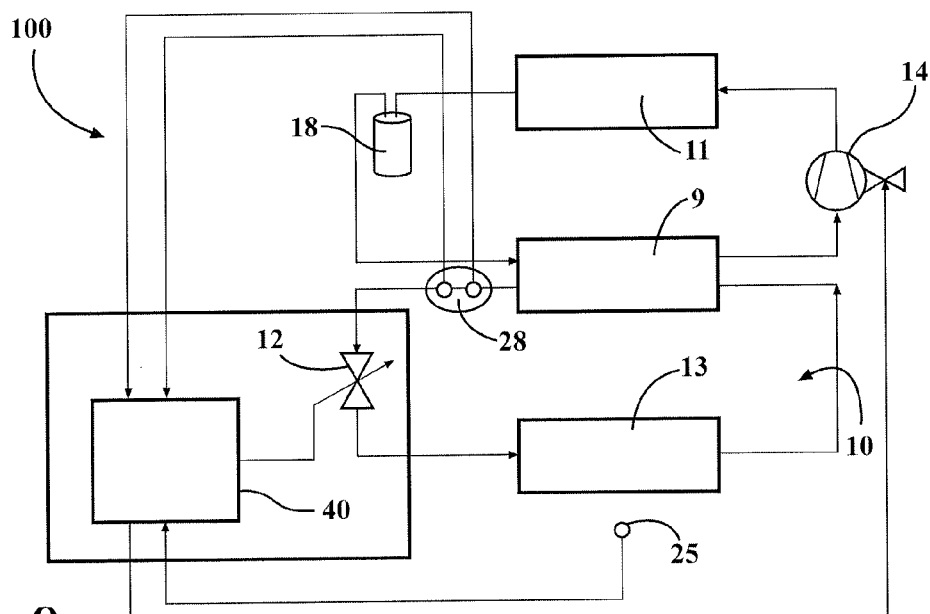

FIGS. 7 and 8 represent simplified variants of the second embodiment, in which control unit 40 also controls the performance of the internal exchanger so as to limit the induction and expulsion temperature of compressor 14, or in which control unit 40 controls the performance of the internal exchanger from the mass output Mc of the refrigerant fluid, in addition to the regulation of the control variable relating to the sub-cooling.

More precisely, in the embodiment from FIG. 7, control unit 40 controls expansion valve 12 so as to regulate the high pressure of the HP refrigerant fluid, according to a chosen regulation rule. In addition, control unit 40 controls the efficiency $E_{IHX}$ of internal exchanger 9 to further adjust the functioning of expansion valve 12.

Control unit 40 carries out the regulation of the high pressure HP by comparing a measurement of the high pressure HP with its reference value $HP_{cons}$, according to the chosen regulation rule, for example a PID type closed loop regulation rule, and acts on expansion valve 12 as a function of the result of this comparison.

In this embodiment, the measurement of the high pressure HP is obtained thanks to a sensor 27 placed at the outlet of condenser 11 which provides the pressure for the refrigerant fluid at the outlet of condenser 11. Moreover, control unit 40 calculates the reference value for the high pressure $HO_{cons}$ from the measurement of the temperature Tsc of the refrigerant fluid a the outlet of the condenser. In this variant, it is advantageous to also measure the temperature Tsc upon exit from condenser 11 since that allow utilizing a single temperature and pressure sensor 27, placed at the outlet of condenser 11, that at the same time provides the temperature Tsc and the pressure HP of the refrigerant fluid.

The sub-cooling SC corresponds to the difference between the saturation temperature Tsat of the refrigerant fluid and the temperature upon entry into the expander Tsc, according to the following equation:

$$SC = T\text{sat}(HP) - Tsc,$$

where the saturation temperature Tsat of the refrigerant fluid is a function of the pressure HP of the refrigerant fluid upon entry into expansion valve 12.

Control unit 40 carries out the regulation of the sub-cooling SC by comparing a calculated value of the sub-cooling SC with its reference value $SC_{cons}$, according to a chosen regulation rule, for example a PID type closed loop regulation rule. It then acts on expansion valve 12 as a function of the result of this comparison.

The value of the sub-cooling SC is obtained thanks to a sensor 27 placed at the outlet of condenser 11 that provides a measurement of the temperature Tsc of sub-cooling of the refrigerant fluid, and a measurement of the high pressure HP of the refrigerant fluid upon entry into expansion valve 12. The measurement of the high pressure permits determining the saturation temperature Tsat of the refrigerant fluid.

In the two embodiments from FIGS. 7 and 8, control unit 40 can additionally regulate the efficiency $E_{IHX}$ of internal exchanger 9 by comparing it with an efficiency limit $L_{IHX}$. The functioning of the control valve is adjusted when the result of the comparison indicates that the efficiency $E_{IHX}$ exceeds the efficiency limit $L_{IHX}$.

Taking into account the efficiency $E_{IHX}$ of internal exchanger 9 to control expansion valve 12 allows guaranteeing a protection against too high an expulsion temperature for the compressor and limiting the induction pressure of the compressor. In order to do this, the efficiency of internal exchanger 9 is evaluated from the output of refrigerant fluid.

According to the system in FIG. 7, the mass output Mc can be calculated from the condenser model, therefore from the sub-cooling temperature Tsc, from the ambient temperature and from the high pressure HP, for which a measurement is provided by sensor 27.

According to the embodiment from FIG. 8, control unit 40 controls expansion valve 12 so as to regulate the sub-cooling of the refrigerant fluid and the efficiency of internal exchanger 9 in order to limit the induction and expulsion temperature of compressor 14.

In the system from FIG. 8, control unit 40 can estimate the efficiency $E_{IHX}$ of internal exchanger 9 by calculating the refrigerant fluid mass output Mc. The output Mc can, for example, be calculate according to the following relationship:

$$Mc = Kv \cdot [2\rho \cdot (HP - LP)]^{1/2}$$

where $\rho$ is the volume mass of the fluid, and LP represents the low pressure that can be estimated according to the control rule of the compressor.

The efficiency value $E_{IHX}$ of internal exchanger 9 can then be estimated experimentally or by simulations, from the calculated value of the refrigerant fluid mass output Mc. For example, it can be determined by using a graph analogous to that in FIG. 11.

Figure 11:
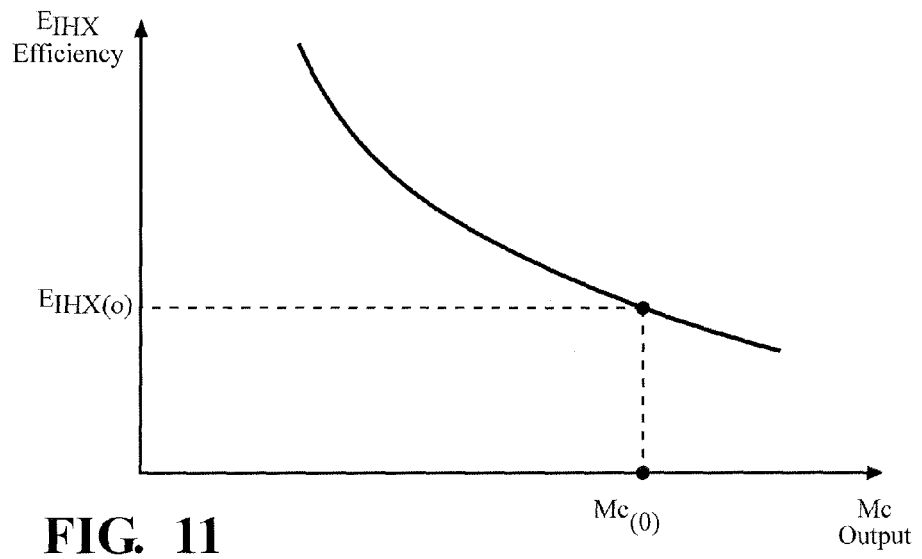
FIG. 11 is a graph representing the development of the efficiency $E_{IHX}$ as a function of the fluid mass output Mc in the condenser.

FIG. 11 in effect gives an example of a development rule connecting the efficiency $E_{IHX}$ of the internal exchanger to the fluid output Mc. Notably, it shows that the efficiency $E_{IHX}$ diminishes as a function of the fluid output Mx and that a given value $MC_{(0)}$ corresponds to a unique value $E_{IHX(0)}$ on the curve.

Control unit 40 can then draw an estimation of the efficiency of the internal exchanger, $E_{IHX}$, from such a graph, from the calculated value of the refrigerant fluid output Mc.

Figure 9:
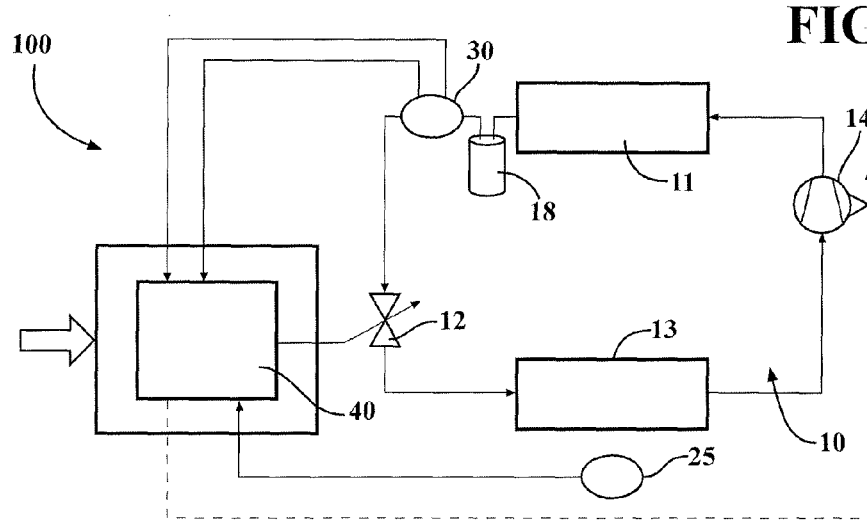

FIG. 9 represents a simplified variant of FIG. 8, in which the air conditioning circuit is not provided with an internal exchanger.

In this variant, a dehydrator tank 16 can be provided at the outlet of condenser 11 to ensure a reserve of refrigerant fluid, being supplied to the expander as a liquid, and/or to eliminate harmful acids an foreign particles.

In this variant, the invention provides for a temperature and pressure sensor 30 at the outlet of condenser 11 in order to carry out a regulation of the sub-cooling SC or a regulation of the pressure HP as described in reference to FIGS. 7 and 8. In the absence of the internal exchanger, there is no place to provide an additional regulation of the efficiency of the internal exchanger or a regulation of the expulsion pressure and temperature upon exit from compressor 14. Therefore, this variant only involves two sensors: a temperature and pressure sensor 30 used to control expansion valve 12, and a temperature probe 25 used to control compressor 14.

Figure 10:
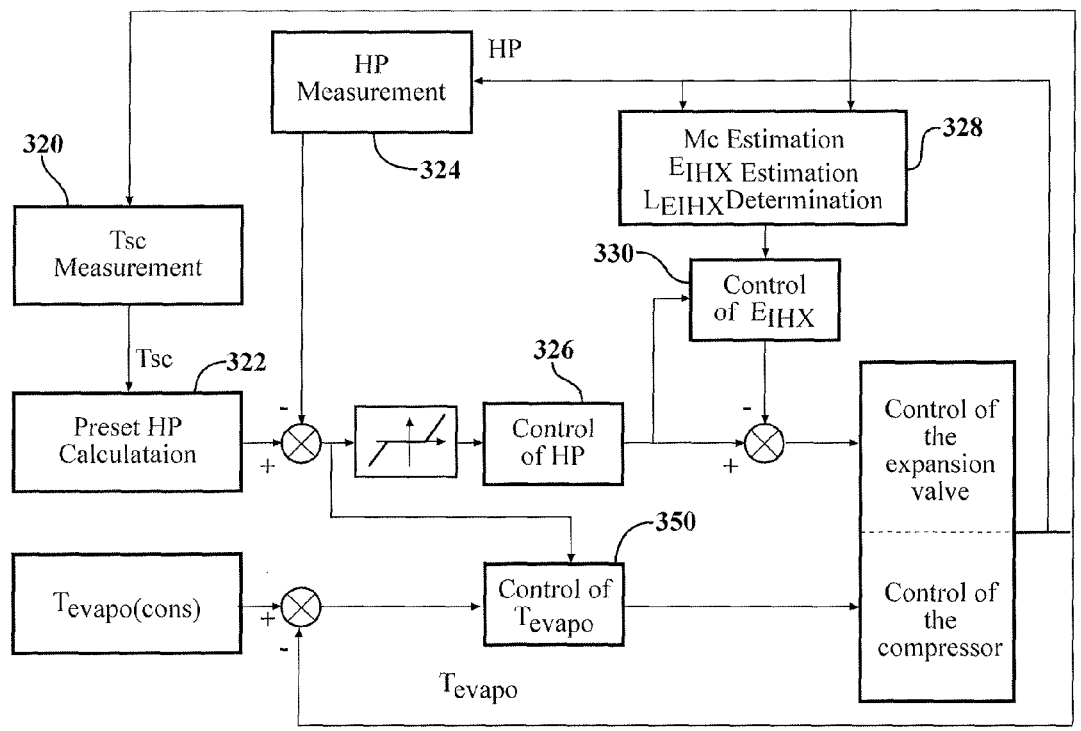
FIG. 10 is a functional diagram of the embodiment variant of the invention illustrated in FIG. 7.

Reference is now made to the functional diagram of FIG. 10, that illustrates the control of expansion valve 12 and the externally controlled compressor according to the variant from FIG. 7.

At step 322, control unit 40 determines the reference value of the variable HP relative to the sub-cooling, $HP_{cons}$, from the measurement of temperature Tsc provided by sensor 27 at step 320.

At step 324, control unit 40 receives the measurement of the variable HP from sensor 27.

At step 326, control unit 40 then compares this HP measurement with its reference value $HP_{cons}$ obtained at step 322. At step 326 (PID regulation), the control signal for expansion valve 12 is then adjusted such that the variable HP does not reach its reference value.

In addition, control unit 40 controls the efficiency $E_{IHX}$ of internal exchanger 9, at step 330, by comparing it to an efficiency limit $L_{IHX}$. At step 328, control unit 40 first estimates the fluid output Mc by the condenser model, the efficiency $E_{IHX}$ from the estimated fluid output Mc, and determines the efficiency limit $L_{IHX}$. The functioning of the control valve is adjusted when the result of the comparison indicates that the efficiency $E_{IHX}$ exceeds the efficiency limit $L_{IHX}$.

At the same time, control unit 40 controls compressor 14 so as to regulate the evaporation temperature $T_{evapo}$: control unit 40 compares, at step 350, the value of the evaporation temperature $T_{evapo}$ with its reference value $T_{evapocons}$, provided by the passenger compartment control panel. The control signal for compressor 14 is then adjusted such that the variable relating to superheating does not reach its reference value.

Figure 12:
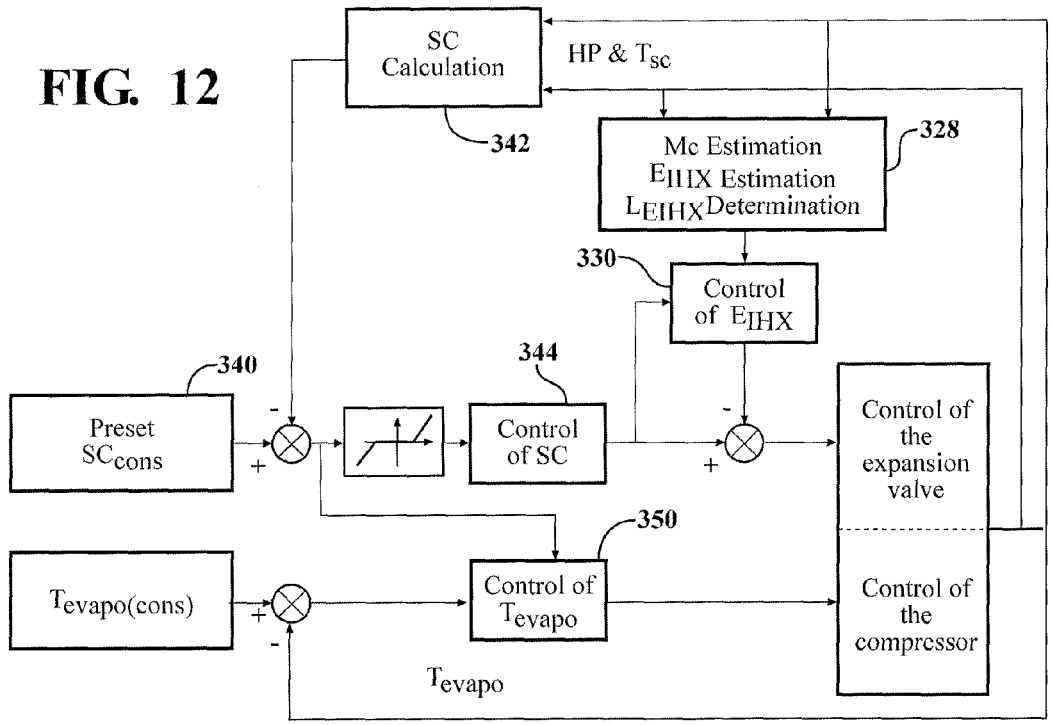
FIG. 12 is a functional view of the embodiment variant of the invention illustrated in FIG. 8.

The functional diagram of FIG. 12 illustrates the control of expansion valve 12 and the externally controlled compressor according to the variant from FIG. 8.

In this variant, at step 340, control unit 40 determines the reference value of the sub-cooling $SC_{cons}$ according to a table established by test results or by simulation. $SC_{cons}$ corresponds to the maximum of the optimal coefficient of performance (COP).

At step 342, control unit 40 then calculates the value of the sub-cooling SC from the measurement of the high pressure HP and of the measurement of the temperature Tsc, upon entry into expansion valve 12, provide by sensor 28.

At step 344, the control unit then compares this value SC with its reference value $SC_{cons}$. The control signal for expansion valve 12 is then adjusted such that the variable relating to superheating does not reach its reference value.

Control unit 40 can additionally control the efficiency $E_{IHX}$ of internal exchanger 9 and compressor 14, as described in reference to FIG. 7.

The invention therefore allows controlling electronic expansion valve 12 and, if appropriate, externally controlled compressor 14, by optimizing the coefficient of performance (COP) and by using a minimum number of sensors in the air conditioning circuit. In particular, the invention allows the avoidance of the utilization of a pressure sensor at the outlet of the evaporator, and thus decreases the costs of the system.

According to various embodiments disclosed above, the systems described include internal exchangers. In addition, the examples described have been made by assuming circuits including a condenser. However, the present invention also covers circuits equipped with gas coolers.

Thus, the present invention is not limited to the embodiments described above as examples and also covers systems only possessing an internal exchanger and/or equipped with a gas cooler.

The invention claimed is:

1. An air conditioning system for a motor vehicle, the air conditioning system comprising;
   a compressor (14) including a control valve, for which a passage section varies as a function of a compressor control signal,
   a condenser or a gas cooler (11),
   an electronic expansion valve (12), for which a degree of opening varies as a function of a control signal with the degree of opening having a predetermined opening threshold,
   an evaporator (13),
   a refrigerant fluid for circulating though the compressor (14), the condenser or gas cooler (11), the electronic expansion valve (12), and the evaporator (13),
   an internal exchanger (9) allowing the refrigerant fluid circulating from the condenser or gas cooler (11) towards the expansion valve (12) to exchange heat with the refrigerant fluid circulating from the evaporator (13) toward the compressor (14),
   a pressure and temperature sensor (20) positioned at an outlet of the compressor (14) with the pressure and temperature sensor (20) configured to measure temperature and pressure of the refrigerant fluid at the outlet of the compressor,
   a temperature probe (29) positioned at an inlet of expansion valve (12) and placed into contact with the refrigerant fluid upon entry of the refrigerant fluid into the expansion valve (12) with the temperature probe (29) configured to measure a sub-cooling temperature of the refrigerant fluid; and
   a control unit (40) in communication with the compressor (14), the expansion valve (12), the temperature and pressure sensor (20), and the temperature probe (29),
   wherein the control unit (40) generates the control signal for varying the degree of opening of the expansion valve and generates the compressor control signal for adjusting a capacity of the compressor (14) based on the temperature and the pressure measured by the pressure and temperature sensor (20) and on the sub-cooling temperature of the refrigerant fluid measured by the temperature probe (29) for regulating a control variable relating to superheating of the evaporator or to sub-cooling of the condenser (11) according to a chosen regulation rule and so as to regulate an efficiency of the internal exchanger (9), and
   wherein the control signal for varying the degree of opening of the expansion valve is based on a comparison of the temperature and the pressure of the refrigerant fluid carried out by the pressure and temperature sensor (20) with threshold values and is based on a comparison of the sub-cooling temperature of the refrigerant fluid carrier out by the temperature sensor (29) with a reference value.

2. A system according to claim 1, wherein the control unit (40) is capable of determining the reference value of a desired temperature of the refrigerant fluid at the inlet of the expansion valve (12) based on a relationship between a sub-cooling and an optimal coefficient of performance of the system.

3. A system according to claim 2, wherein the control variable relating to the sub-cooling of the condenser (11) corresponds to the sub-cooling temperature of the refrigerant fluid.

4. A system according to claim 1, wherein the compressor (14) is an externally controlled compressor and the control unit (40) is further capable of controlling the expansion valve and the compressor so as to maintain a temperature and an expulsion pressure at an outlet of the compressor (14) below respective predetermined thresholds.

5. A system according to claim 1, wherein the control unit is capable of comparing an efficiency of the internal exchanger with a predefined threshold to regulate the efficiency of the internal exchanger (9).

6. A system according to claim 1, wherein the control unit is capable of determining an efficiency value of the internal exchanger (9) from a mass output of the fluid estimated as a function of measurements of a high pressure and a sub-cooling temperature of the refrigerant fluid.

7. A system according to claim 1, wherein the regulation of the control variable is a closed-loop regulation.

8. A system according to claim 1, wherein the control unit generates the compressor control signal for the compressor to limit a temperature of discharge and/or suction of the compressor.

9. A system according to claim 1, wherein the control unit (40) generates the compressor control signal for adjusting a capacity of the compressor (14) once the degree of opening of the expansion valve (12) required by the control signal is greater than the predetermined opening threshold of the expansion valve (12).

* * * * *